Figure 1:
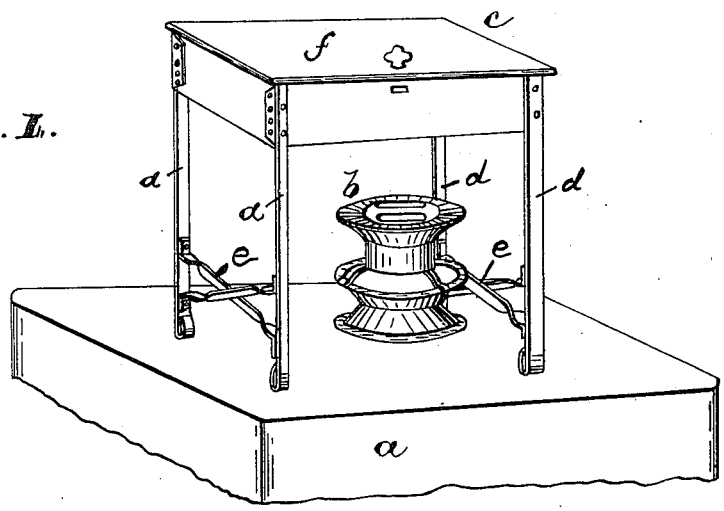

No. 667,552. Patented Feb. 5, 1901.
M. MORRIS.
FOOD WARMER FOR OIL STOVES, &c.
(Application filed Aug. 26, 1899.)

(No Model.)

WITNESSES:
Alfred R. Krausse.
Russell M. Everett.

INVENTOR:
Marie Morris,
BY
Drake & Co.
ATTORNEYS

THE NORRIS PETERS CO., PHOTO-LITHO., WASHINGTON, D. C.

UNITED STATES PATENT OFFICE.

MARIE MORRIS, OF NEWARK, NEW JERSEY.

FOOD-WARMER FOR OIL-STOVES, &c.

SPECIFICATION forming part of Letters Patent No. 667,552, dated February 5, 1901.

Application filed August 26, 1899. Serial No. 728,548. (No model.)

*To all whom it may concern:*

Be it known that I, MARIE MORRIS, a citizen of the United States, residing at Newark, in the county of Essex and State of New Jersey, have invented certain new and useful Improvements in Food-Warmers for Oil-Stoves, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The general object of this invention is to provide means for keeping already-cooked food warm while using a gas-stove, oil-stove, or other small stove adapted to be used for minor purposes where a range or large stove would occasion too great a heating of the apartment in which the work is done. Hitherto in the use of this class of stoves, which are usually small, it has been found that in preparing a meal the articles first cooked become cold in a greater or less degree while the last ones are on the stove, said first dishes having to be removed when cooked because there is not room on the stove for all at one time. Thus by the time the whole dinner is ready to be served the first dishes have become unpalatable and unfit to eat by reason of cooling, and the dinner is spoiled. For this reason the use of such stoves has been restricted to single dishes, lunches, and the like, and it has not been practicable to cook a dinner on them.

The objects of this invention are to enable a small oil-stove or the like to be used in the preparation of a dinner or a meal consisting of several dishes, to provide means for keeping the first-cooked articles warm while others are being cooked, and to provide such means entirely independent of the stove, so that it can be used or not, as desired, and can be used with any style or form of stove; to provide a food-warmer which will permit the stove to be used for cooking in the usual manner and will utilize only the heat escaping from such cooking; to provide a food-warmer which will protect the food from dust or other foreign matter and which will not only keep the food warm while standing over the stove, but also for a considerable length of time after the stove has been removed, and to secure other advantages and results, some of which may be referred to in connection with the description of the several parts.

The invention consists in the food-warmer for oil-stoves and the like and in the arrangements and combinations of parts of the same, all substantially as will be hereinafter set forth and finally embraced in the clauses of the claim.

Figure 2:
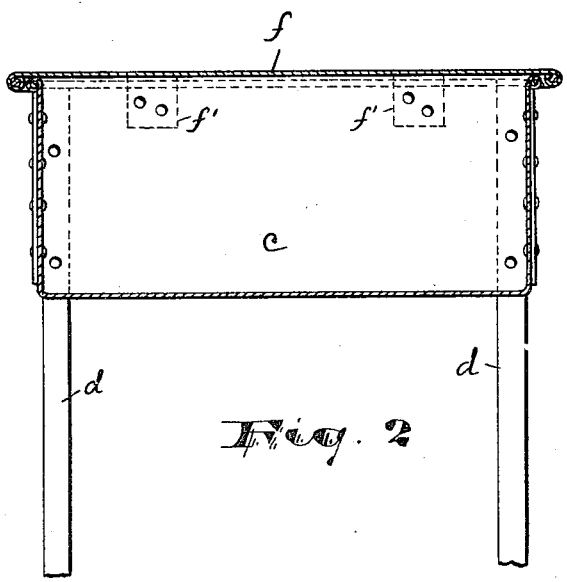
Figure 3:
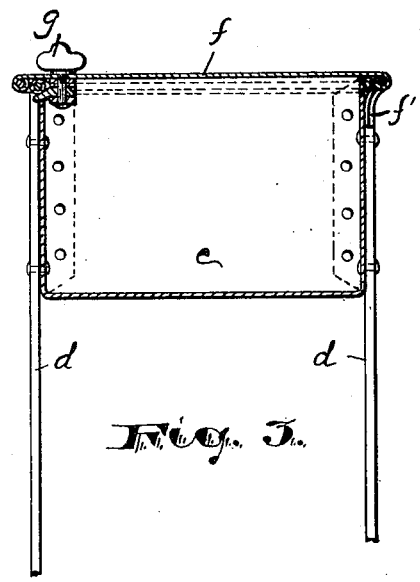

Referring to the accompanying drawings, in which like letters of reference indicate corresponding parts in each of the several views, Figure 1 is a perspective view showing my improved food-warmer in operative relation to an oil-stove. Fig. 2 is a central longitudinal sectional view of the same, and Fig. 3 is a transverse central section.

In said drawings, *a* indicates a table or bench, and *b* an oil-stove standing thereon, although it will be understood that my invention could be used just as well in connection with other stoves, such as gas or gasolene, or even on an ordinary range.

In carrying out my invention I provide a metal box-like body portion *c*, preferably of sheet-iron to better withstand the heat, formed in a rectangular shape and of considerable area in proportion to the depth. Into this box-like receptacle the dishes of food are set in using the warmer, said dishes thus standing upon the floor or bottom of the interior chamber. Said body portion *c* is provided with suitable legs *d*, arranged at each corner, by means of which the box-like body *c* may be supported directly over the stove *a*. Said legs are of such length as to hold the body *c* at a sufficient height above the stove *a* so that there shall be space between to use the stove for cooking purposes at the same time the warmer stands above it.

The warmer presents at its under side a broad surface to the heat rising above the stove from the cooking operations, and thus the heat which would otherwise be lost is utilized in keeping warm the food placed in the body portion *c*, as above described.

The body of the warmer is preferably formed by suitably folding or bending up a flat sheet of metal and joining the same at the corners in any manner common to the art. The legs *d* are then riveted to the body *a*, and at a lower point said legs are made more firm and rigid by braces *e*. The body of the warmer is also preferably made broad and shallow, so that several dishes can be set therein at one time and receive heat from the stove *b* beneath. The iron or the metal of which the body portion is made becomes heated and serves to conduct the heat to all parts of the body, and after the whole warmer has become well heated it is evident that the same will retain heat for a considerable time to keep the food warm even should the stove be removed. To further retain the heat and to protect the food from dust, &c., I have provided the body of the warmer with a cover *f*, also of metal and adapted to rest upon the top edges of the sides of the body. Said cover is hinged at one side edge, as at *f*, to the body portion *c* in any suitable manner, and at the opposite edge is a catch *g* of ordinary construction for holding the cover closed. The interior chamber of the warmer is thus tightly inclosed and will retain heat for a considerable time after the stove has been removed or extinguished, as above mentioned. This enables me under some conditions to cook first and place in the warmer such dishes as do not require to be served smoking hot, but only warm, and then set the warmer to one side, so as to have wholly unimpeded use of the stove for cooking such dishes as must go directly from the cook's hands to the table.

The cover *f* is preferably made flat at its upper side, as shown, and forms not only a means for retaining the heat within the chamber, but also a shelf or table, upon which articles used in cooking may be temporarily set, the said shelf or table thus being portable independent of the stove or heating means.

It will be understood that my improved warmer can be made in any size to use in connection with single or double stoves or with stoves of different heights. I may, if desired, make the legs *d* adjustable to various lengths by any of the well-known means in common use without departing from the spirit of the invention.

It will be seen that my invention may, if desired, be used in connection with a range or cooking-stove, the warmer being in this case stood directly upon the top of the stove. In this position the warmer serves to receive food already cooked and keep the same at the proper temperature, where the oven of the range would be too hot and dry up the said food.

It will be evident that various modifications may be made in constructing my improved food-warmer without departing from the spirit and scope of the invention, and I do not, therefore, wish to be limited by the positive description of details herein except as the state of the art may require.

Having thus described the invention, what I claim as new is—

1. A portable food-warmer for use in connection with small cooking-surfaces such as will receive only one or two cooking vessels at a time, comprising a covered box-like body portion formed of sheet metal and adapted to conduct heat to its interior without injury to itself, said body portion providing a closed warming-chamber adapted to inclose dishes of food and corresponding in relative horizontal area to the size of the cooking-surface, legs extending downward from the body portion adjacent to but independent of the cooking-surface and being of iron to resist the heat, said legs supporting the closed chamber above said cooking-surface at a height which permits cooking operations to be carried on beneath while the waste heat warms the contents of said chamber, the whole warmer being separate from the cooking-surface and portable and capable of being removed entirely away from the cooking-surface, the closed chamber retaining the heat of its contents when the source of heat is removed, substantially as set forth.

2. The herein-described food-warmer for oil and other small stoves, said warmer comprising a box-like inclosure of sheet-iron or the like adapted to conduct heat to its interior through the top, bottom and sides without injury thereto, and at the same time inclose dishes of food and protect them from dust and evaporation, said body portion being in horizontal area a little larger than the stove and having legs extending downward at the sides of the stove, said legs being of iron to resist the heat of the stove and holding the body portion above the stove to receive heat therefrom without interfering with cooking operations, and the top of the box-like body portion being a hinged cover permitting access to the interior and presenting a flat shelf-like upper surface, the entire warmer being portable and independent of the stove and adapted to retain the heat within the interior chamber when removed from the stove, substantially as set forth.

In testimony that I claim the foregoing I have hereunto set my hand this 4th day of August, 1899.

MARIE MORRIS.

Witnesses:
CHARLES H. PELL,
C. B. PITNEY.